(12) United States Patent
Yaczkanich

(10) Patent No.: US 7,044,268 B2
(45) Date of Patent: May 16, 2006

(54) ALL-TERRAIN VEHICLE SUPPORT BRACKET

(76) Inventor: Charles M. Yaczkanich, 5 Naomi St., Fayette City, PA (US) 15438

( * ) Notice: Subject to any disclaimer, the term of this patent is extended or adjusted under 35 U.S.C. 154(b) by 41 days.

(21) Appl. No.: 10/773,104

(22) Filed: Feb. 5, 2004

(65) Prior Publication Data
US 2005/0023313 A1 Feb. 3, 2005

Related U.S. Application Data

(63) Continuation-in-part of application No. 10/166,961, filed on Jun. 11, 2002, now Pat. No. 6,708,799.

(51) Int. Cl.
*E06C 5/00* (2006.01)
*E04G 1/00* (2006.01)

(52) U.S. Cl. ..................... 182/127; 182/129

(58) Field of Classification Search ............ 182/127, 182/129, 106, 230; 224/310, 405, 552, 42.42, 224/42.1 F, 42.38; 248/503, 226, 201; 211/182, 211/13, 195; 280/4, 32.5, 481
See application file for complete search history.

(56) References Cited

U.S. PATENT DOCUMENTS

| | | | |
|---|---|---|---|
| 615,721 A | 12/1898 | Lane | |
| 3,580,441 A | 5/1971 | Zercher | |
| 4,607,773 A | 8/1986 | Mason | |
| 4,696,374 A | 9/1987 | Hale | |
| 4,751,981 A * | 6/1988 | Mitchell et al. | 182/127 |
| 5,236,062 A | 8/1993 | Laney | |
| 5,297,844 A | 3/1994 | Haustein | |
| 5,398,778 A * | 3/1995 | Sexton | 182/127 |
| 5,642,844 A | 7/1997 | Rector | |
| 5,651,484 A | 7/1997 | Fugman | |
| 5,816,462 A | 10/1998 | Brantley | |
| 5,850,891 A * | 12/1998 | Olms et al. | 182/127 |
| 5,863,173 A | 1/1999 | Bremner | |
| 5,881,839 A | 3/1999 | Stanley | |
| 6,012,545 A | 1/2000 | Faleide | |
| 6,086,031 A | 7/2000 | Renfro | |
| 6,105,721 A * | 8/2000 | Haynes | 182/127 |
| 6,290,023 B1 | 9/2001 | Martin | |
| 6,345,691 B1 | 2/2002 | Ruiz | |

* cited by examiner

*Primary Examiner*—Hugh B. Thompson II
(74) *Attorney, Agent, or Firm*—Nathan J. Prepelka; The Webb Law Firm

(57) ABSTRACT

The present invention is an all-terrain vehicle support bracket. The support bracket includes on or more frame assemblies that are removably attachable to a portion of an all-terrain vehicle. The frame assembly or assemblies include support surfaces thereon for supporting an object as positioned on the surface. A variety of objects may be positioned on and supported by the support surface of the frame assembly.

15 Claims, 5 Drawing Sheets

ALL-TERRAIN VEHICLE SUPPORT BRACKET

CROSS REFERENCE TO RELATED APPLICATIONS

This application is a continuation-in-part of U.S. patent application Ser. No. 10/166,961, filed Jun. 11, 2002, which issued as U.S. Pat. No. 6,708,799B1 on Mar. 23, 2004, both of which are herein incorporated by reference in their entirety.

BACKGROUND OF THE INVENTION

1. Field of the Invention

The present invention relates generally to removable devices or accessories for all-terrain vehicles and, more particularly, to an all-terrain vehicle support bracket.

2. Description of the Related Art

The use of all-terrain vehicles or "ATVs" has reached an all time high among adolescents as well as adults. While the initial intent of such vehicles was for recreational use, hunters early on recognized that ATVs could be extremely advantageous for traveling into remote, off-road areas where game is typically found. For instance, ATVs greatly decreased the work of having to drag game out of such remote regions.

Also, many hunters take advantage of elevated devices such as tree stands for providing an extended view of the field below as well as to be out of game's sight. However, while the utility of ATVs for trekking to an fro remote hunting areas has been quickly recognized and enjoyed, standard ATVs have not provided for or been capable of aiding the hunter in transporting climbing aids and similar equipment for ascending into tree stands.

ATVs are also in wide use in both residential and commercial farming, gardening and similar applications. However, these activities typically include the use of ancillary equipment, which must be dragged or otherwise transported to the various remote locations in these settings. Therefore, there remains a need for a structure for transporting equipment, tools, supplies and other objects to these remote locations using the ATV.

A search of the prior art did not disclose any patents that read directly on the claims of the instant invention; however, the following references were considered related.

U.S. Pat. No. 5,297,844 issued in the name of Haustein discloses a cab and hunting stand being attachable to and easily removable from the front and rear racks of an ATV.

U.S. Pat. No. 4,696,374 issued in the name of Hale discloses a portable hunting stand adapted to be retrofitted to a three wheeled motorcycle, ATV or the like.

U.S. Pat. No. 615,721 issued in the name of Lane discloses a basket which has a lower portion comprising a section of frame which is provided with a protective covering being spark preventative.

U.S. Pat. No. 5,236,062 in the name of Laney describes a support rack adapted for mounting to an all-terrain vehicle framework.

U.S. Pat. No. 5,863,173 issued in the name of Bremner describes a vehicular deck attachment and assembly.

U.S. Pat. No. 6,012,545 issued in the name of Faleide discloses a foldable vehicle ladder system for allowing a user to easily view and access the interior portion of a truck box and other equipment.

U.S. Pat. No. 5,642,844 issued in the name of Rector describes a tree stand carrier for an ATV.

U.S. Pat. No. 6,290,023 B1 issued in the name of Martin discloses a system and apparatus for converting a trailer to an observation stand.

U.S. Pat. No. 5,881,839 issued in the name of Stanley discloses a hunter's stand for securement to the bed of a pick-up truck.

U.S. Pat. No. 6,345,691 B1 issued in the name of Ruiz describes a ladder latch system for securing telescoping ladders in the retracted position.

U.S. Pat. No. 6,086,031 issued in the name of Renfro describes a gun and beverage support system for supporting a weapon and a beverage while the hunter is sitting or standing within a tree stand.

U.S. Pat. No. 5,651,484 issued in the name of Fugman describes a ladder support accessory for a truck rack, wherein the assembly includes various parts that must be permanently attached or welded to the truck rack.

Consequently, a need has been felt for providing a removably attachable device for an ATV which supports various objects, such as a traditional aluminum ladder, in a manner which is quick, easy, and efficient.

SUMMARY OF THE INVENTION

It is, therefore, an object of the present invention to provide an all-terrain vehicle support bracket for use in supporting various objects adjacent an all-terrain vehicle. It is a further object of the present invention to provide an all-terrain vehicle support bracket that allows the all-terrain vehicle to transport an object, such as a ladder, to various remote locations. It is a still further object of the present invention to provide an all-terrain vehicle support bracket that is easily and removably attached to a portion of the all-terrain vehicle. It is yet another object of the present invention to provide an all-terrain vehicle support bracket for use in connection with a standard all-terrain vehicle and for supporting a traditional aluminum ladder.

It is another object of the present invention to provide a support bracket designed to be removably attached to both a front and rear ATV horizontal frame member as are associated with a traditional ATV. It is another object of the present invention to provide a support bracket fabricated of cold rolled, hollow steel tubing. It is another object of the present invention to provide a main leg member with a curved, lower end which forms a threaded cusp. It is another object of the present invention to provide a V-shaped extension member with a lower end defining complementary threads for threadedly engaging the threaded cusp. It is another object of the present invention to provide a V-shaped extension member which is available in a plurality of sizes having various lengths. It is another object of the present invention to provide an upper arm member which extends perpendicularly from the main leg member and bifurcates into two laterally opposed retainment arms. It is another object of the present invention to provide retainment arms which are mechanically impinged against cross members of the front and rear ATV horizontal frame members. It is another object of the present invention to provide a support bracket designed so as to accommodate at least two aluminum ladders. It is still another object of the present invention to provide a support bracket designed and configured so as to rest in an angular plane which allows for total ATV tire clearance when tires are facing forward as well as when turned.

Accordingly, the present invention is directed to an all-terrain vehicle support bracket. The support bracket includes at least one frame assembly that is removably attachable to a portion of an all-terrain vehicle. Further, the frame assembly includes a support surface thereon, and this support surface is sized and shaped so as to support an object that is positioned on the surface. Further, the support surface may support a variety of objects, such as a ladder, a container, a bag, tools, equipment, garden tools, lawn tools, rope, posts, fencing supplies, a gate, farm equipment, farm equipment attachments, wood, boards, building supplies, construction supplies, etc.

Briefly described according to one embodiment of the present invention, an all-terrain vehicle support bracket is provided. The support bracket includes a pair of tubular frame assemblies adapted for removable attachment to a traditional all-terrain vehicle (ATV) to serve as a support means. More specifically, the present invention is designed and configured to be removably attached to both a front and a rear ATV horizontal frame member as are associated with a traditional ATV.

Each tubular frame assembly comprises a main leg member of a generally elongated configuration, fabricated of cold rolled, hollow steel tubing. The main leg member includes a curved, lower end forming a threaded cusp which is designed to threadedly receive a V-shaped extension member.

The V-shaped extension member is fabricated of cold rolled, hollow steel tubing and has a lower end defining complementary threads for threadedly engaging the threaded cusp. The V-shaped extension member is available in a plurality of sizes comprising various lengths, thereby allowing for the all-terrain vehicle ladder support bracket to accommodate a load capacity of at least two aluminum ladders.

The tubular frame assembly further includes an upper arm member which extends perpendicularly from the main leg member and bifurcates into two laterally opposed retainment arms in a perpendicular manner so as to generally form a T-shaped member.

The frame assembly (or assemblies) are removably attached to a portion of the ATV. The function and method of attachment of one embodiment of the present invention to a traditional ATV is described briefly hereinbelow.

Retainment arms of the upper arm member are directed orthogonally below inner cross members of the front ATV horizontal frame member, wherein retainment arms mechanically impinge against inner cross members. The main leg member rests against a vertical member of the front ATV horizontal frame member. Once a desired V-shaped extension member has been selected and threadedly attached to the threaded cusp, a support surface is created for supporting the object, such as an aluminum ladder, while the main leg member serves as a firm base upon which forward sidewalls of vertical legs of an aluminum ladder can be supported, thereby securably supporting the ladder in a restrained manner for transport.

The aforementioned procedure regarding temporary attachment of the all-terrain vehicle ladder support bracket to the front ATV horizontal frame member is applied in the same manner with respect to temporary attachment of the all-terrain vehicle ladder support bracket to the rear ATV horizontal frame member.

The rear ATV horizontal frame member defines a generally rectangularly-shaped support member which has a plurality of cross members integrally connected therebetween. The cross members function as brace members in the same respect as inner cross members of the front ATV horizontal frame member function.

The use of the present invention allows a standard ATV to be adapted to support a traditional aluminum ladder in a manner which is quick, easy, and efficient.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENT

Figure 1:
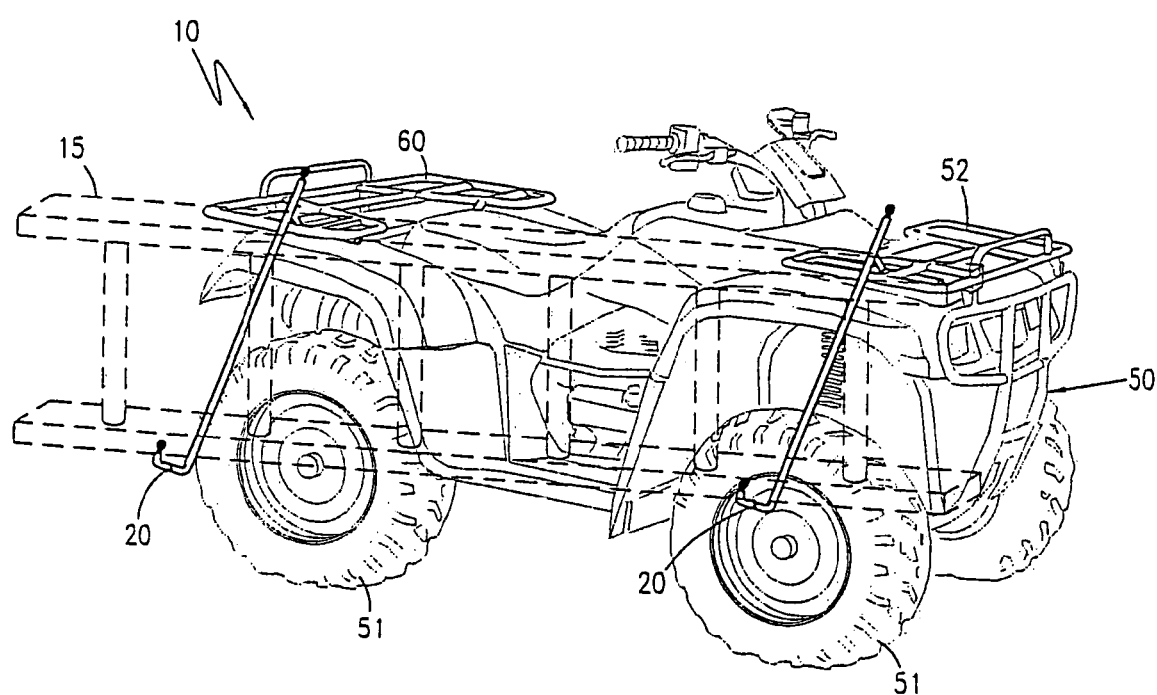
FIG. 1 is a perspective view of an all-terrain vehicle support bracket according to one preferred embodiment of the present invention shown attached to an ATV and supporting an object, in this case an aluminum ladder.
Figure 2:
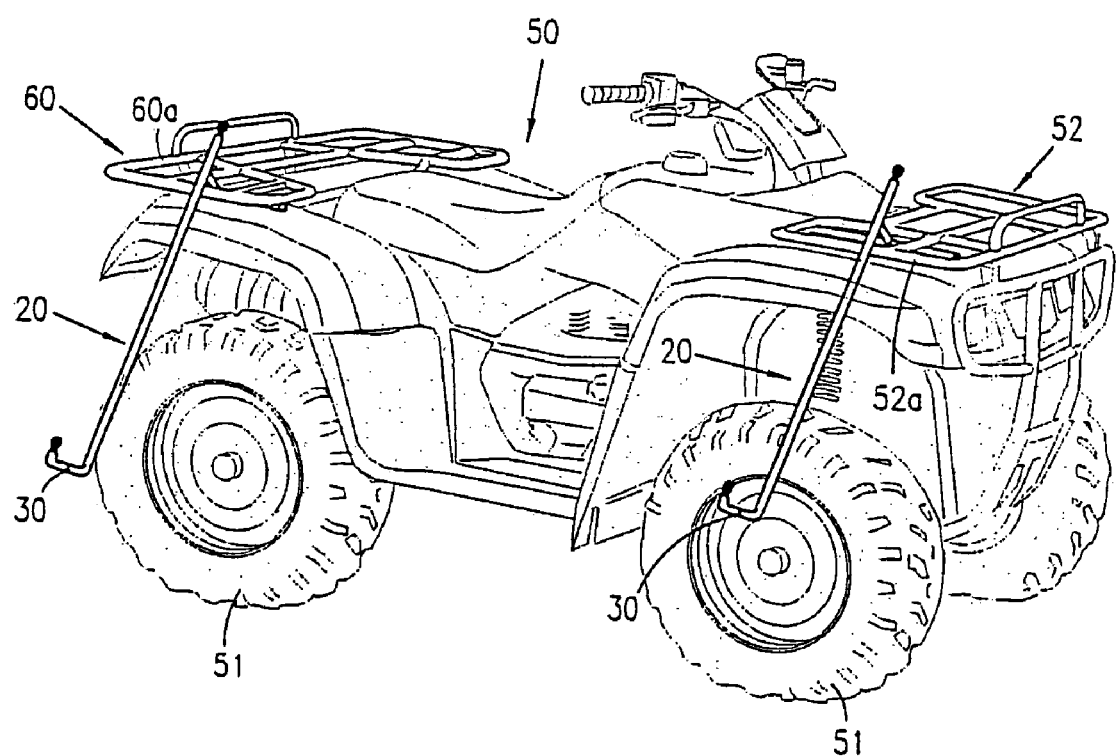
FIG. 2 is a perspective view of the support bracket of FIG. 1 shown attached to an ATV.
Figure 3:
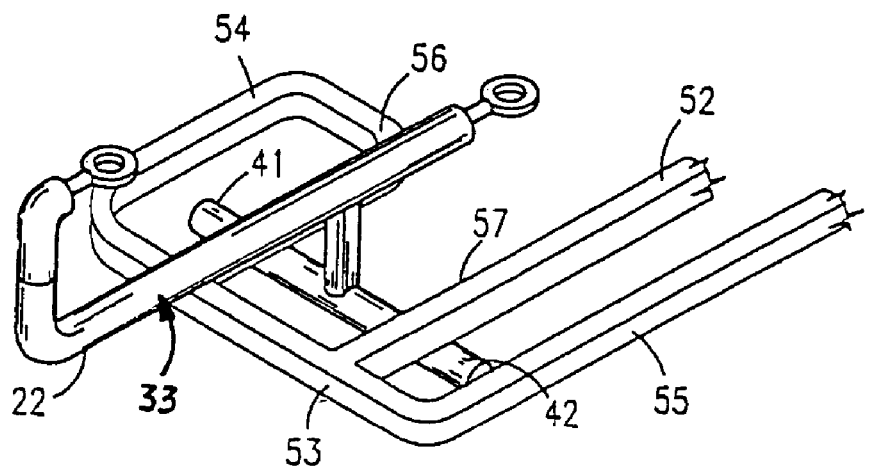
FIG. 3 is a side elevational view of the support bracket of FIG. 1 shown attached to a front ATV horizontal frame member.
Figure 4:
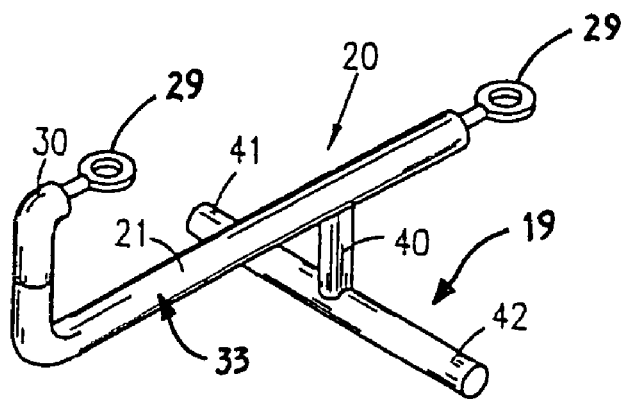
FIG. 4 is a side elevational view of a frame assembly according to the present invention.
Figure 5:
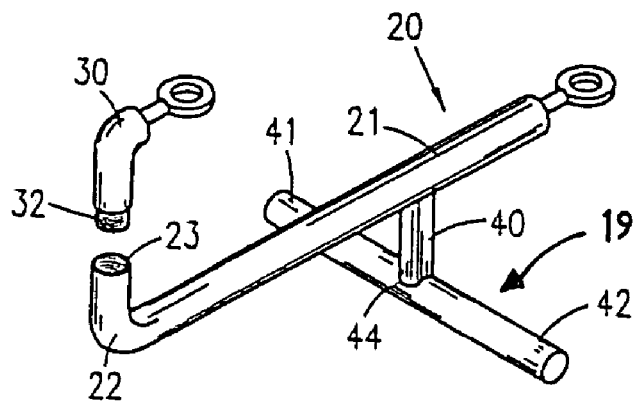
FIG. 5 is an exploded perspective view of the tubular frame assembly of FIG. 4.
Figure 6:
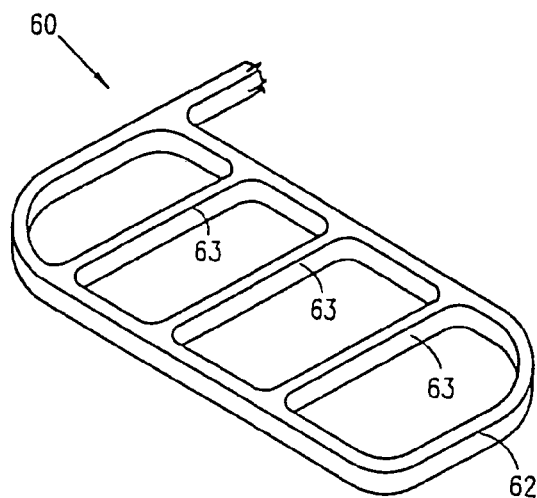
FIG. 6 is a partial top plan view of a rear ATV horizontal frame member according to the prior art.
Figure 7:
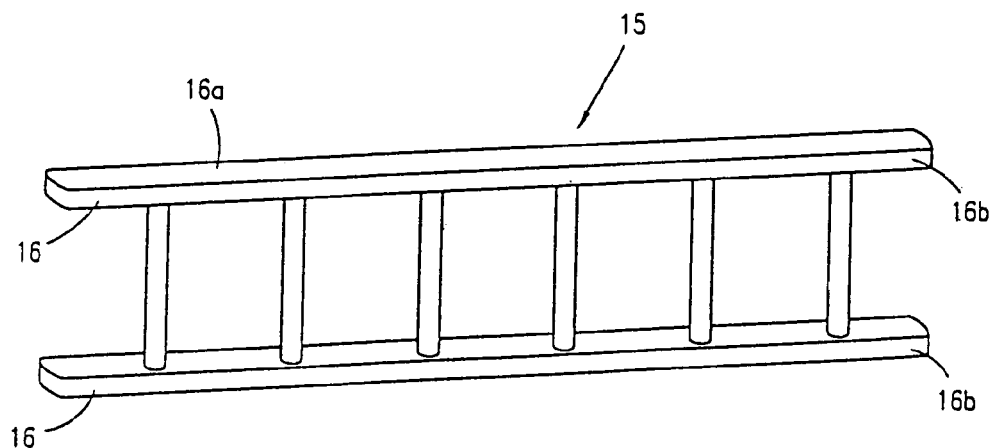
FIG. 7 is a perspective view of a traditional aluminum ladder according to the prior art.
Figure 8:
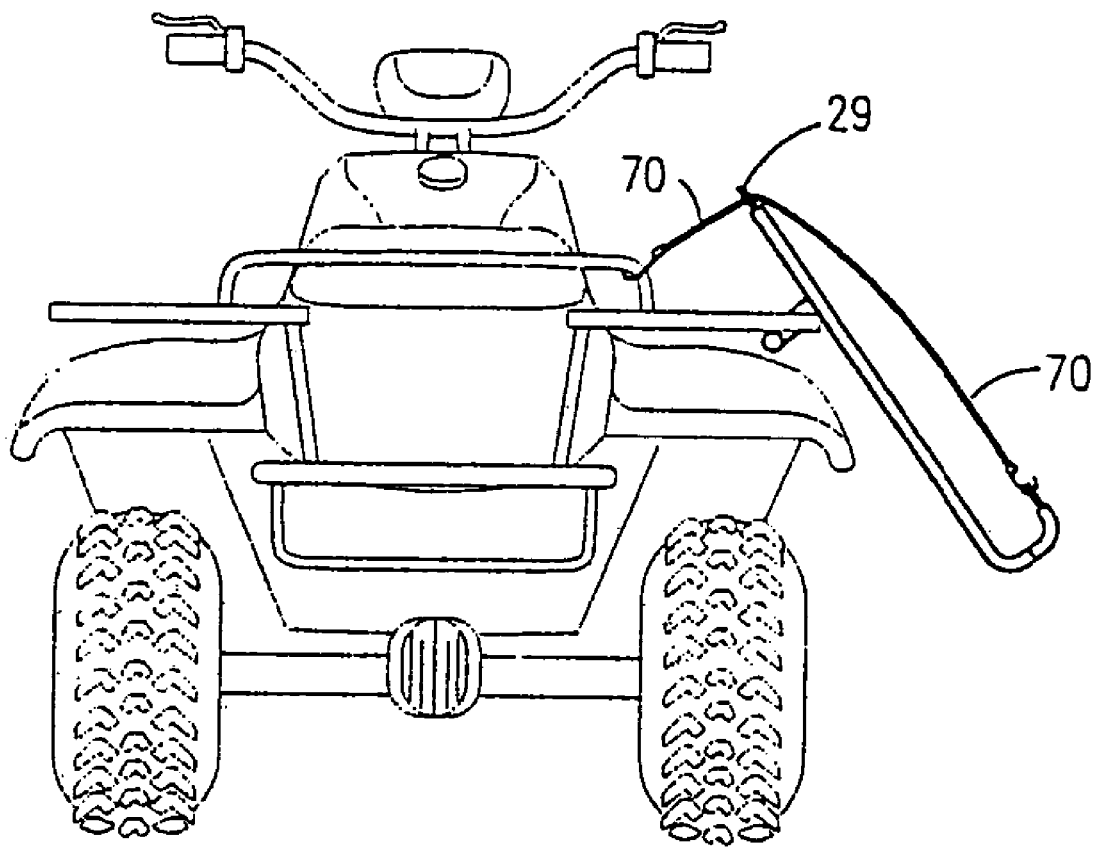
FIG. 8 is a perspective view of the support bracket of FIG. 1 illustrating attachment to an ATV shown from a rear side thereof.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to an all-terrain vehicle (ATV) 50 support bracket 10. The support bracket 10 includes at least one frame assembly 20 that can be removably attached or is removably attachable to a portion of an ATV 50. The frame assembly includes a support surface 33, and the support surface 33 is configured or adapted to support an object, such as a ladder 15, on this support surface 33. While discussed hereinafter in great detail with respect to a ladder 15, it is envisioned that the support bracket 10 and frame assembly 20 of the present invention could support a variety of objects for transport. For example, the object may be a ladder 15, a container, a bag, tools, equipment, garden tools, lawn tools, rope, posts, fencing supplies, a gate, farm equipment, farm equipment attachments, wood, boards, building supplies, construction supplies, etc.

In one preferred embodiment, the support bracket 10 includes a plurality of frame assemblies 20, which are removably attached to or removably attachable to a respective portion of the ATV 50. Each of these frame assemblies 20 includes the aforementioned support surface 33 for supporting an object thereon. In one preferred embodiment, the plurality of frame assemblies 20 is a pair of tubular frame assemblies 20 that are substantially identical in structure.

In one preferred and non-limiting embodiment, the frame assembly 20 includes an elongated main leg member 21, an extension member 30 positioned on a first end of the elongated main leg member 21, and an upper arm member 40 positioned on a second end of the elongated main leg member 21. In addition, in this embodiment, the frame assembly 20 includes a retaining member 19 that is positioned and configured to contact the ATV 50 and attach the support bracket 10 to the ATV 50. The support surface 33 includes at least a portion of the elongated main leg member 21 and/or the extension member 30, such that a surface of the main leg member 21 and/or the extension member 30 allow the object, such as the ladder 15, to be rested and supported thereon. In order to securely hold the object against the ATV 50, the extension member 30 may be a substantially V-shaped extension member 30. In addition, in this embodiment, the retaining member 19 may be a plurality of arms 41, 42 that extends substantially horizontally from the upper arm member 40, thereby providing a substantially horizontally extending retaining member 19. While two retainment arms 41, 42 are illustrated, any number of arms 41, 42 are envisioned in order to allow the support bracket 10 to be securely and removably attached to the ATV 50.

In one preferred and non-limiting embodiment, the frame assembly 20 is comprised of a pair of tubular frame assemblies 20 adapted for removable attachment to the ATV 50 to serve as an object support means. More specifically, in this embodiment, the frame assemblies 20 are designed and configured to be removably attached to both a front and rear ATV horizontal frame member 52, 60, respectively as are associated with a traditional ATV 50. For purposes of this embodiment, each of the pair of tubular frame assemblies 20 are identical, and as such, only a single frame assembly 20 is described henceforth in connection with this embodiment.

The frame assembly 20 comprises a main leg member 21 of a generally elongated configuration, preferably fabricated of cold rolled, hollow steel tubing. It is envisioned that the main leg member 21 may also be fabricated of a rigid, resilient plastic material of high strength or other similarly strong material capable of readily supporting a variety of objects, such as a traditional aluminum ladder 15; however, steel is the preferred fabrication material. The main leg member 21 includes a curved, lower end 22 forming a threaded cusp 23 which is designed so as to threadedly receive a V-shaped extension member 30. An upper end 24 of the main leg member 21 includes an eye 29 affixed in an upright manner to an uppermost extremity thereof. The eye 29 provides a receiving loop for attaching a securement strap 70, such as a bungee strap, thereto.

The V-shaped extension member 30 includes a lower end defining complementary threads 32 for threadedly engaging the threaded cusp 23. The V-shaped extension member 30 includes an upper end having an eye 29 affixed in an upright manner to an uppermost extremity thereof so as to facilitate removable attachment of s securement strap 70 thereto. The V-shaped extension member 30 is available in a plurality of sizes comprising various lengths, thereby allowing for the all-terrain vehicle support bracket 10 to accommodate a load capacity of variously-sized and shaped objects.

Alternatively, it is envisioned that the V-shaped extension member 30 can be extended away from or retracted into the curved, lower end 22 of the main leg member 21 telescopically. As such, the length of the V-shaped extension member 30 is mechanically adjustable, thereby providing various linear lengths, and further being held into a desired position via a spring-loaded pin assembly. However, the preferred method for linear extension and attachment of the V-shaped extension member 30 to the threaded cusp 23 is via threaded engagement as described hereinabove.

The frame assembly 20 further includes an upper arm member 40 extending perpendicularly from the main leg member 21 in a direction opposite to threaded cusp 23. The upper arm member 40 bifurcates into two laterally opposed retainment arms 41, 42 (acting as the retaining member 19) in a perpendicular manner so as to generally form a T-shaped member 44.

In order to best describe the function of the retaining member 19, in this embodiment the retainment arms 41, 42, and main leg member 21, a brief description of the front and rear ATV horizontal frame member 52, 60 is required. The front ATV horizontal frame member 52 defines a first portion 52a comprising a vertical member 53 connected integrally by a first outer cross member 54 and a second outer cross member 55. A first inner cross member 56 and a second inner cross member 57, functioning as brace members, integrally connect to the vertical member 53. Retainment arms 41, 42 of the upper arm member 40 are directed orthogonally below first inner cross member 56 and second inner cross member 57 of front ATV horizontal frame member 52, wherein an upper circumferential surface of retainment arms 41, 42 mechanically impinge against a lower circumferential surface of inner cross members 56, 57. A rear, external circumferential sidewall of main leg member 21, just below upper arm member 40, rests against an upper surface of vertical member 53 of the front ATV horizontal frame member 52.

Once a desired V-shaped extension member 30 has been selected and threadedly attached to the threaded cusp 23, the support surface 33 is created for supporting the object. In this embodiment, the support surface 33 contacts a lateral sidewall 16a of the vertical leg 16 of an aluminum ladder 15, while the main leg member 21 (as part of the support surface 33) serves as a firm base upon which forward sidewalls 16b of vertical legs 16 of aluminum ladder 15 can be supported, thereby securably supporting the ladder 15 in a restrained manner for transport.

When attached for use, the all-terrain vehicle support bracket 10 is designed and configured so as to rest in an angular plane which allows for total tire 51 clearance when tires 51 are facing forward as well as when turned.

The rear ATV horizontal frame member 60 defines a first portion 60a having a generally rectangularly-shaped support member 62. The support member 62 has a plurality of cross members 63 integrally connected therebetween. The cross members 63 function as brace members in the same respect as first inner cross member 56 and second inner cross member 57.

The aforementioned procedure regarding temporary attachment of the all-terrain vehicle support bracket 10 to the front ATV horizontal frame member 52 is applied in the same manner with respect to temporary attachment of the all-terrain vehicle support bracket 10 to the rear ATV horizontal frame member 60.

It should be noted that outer cross member 54 and second outer cross member 55 of the front ATV horizontal frame member 52 in addition to any chosen cross member 63 of rear ATV horizontal frame member 60 may be utilized as a brace member against which retainment arms 41, 42 are mechanically impinged.

It is envisioned that the all-terrain vehicle support bracket 10 can also be utilized for supporting a variety of objects, such as lumber, fence posts, and other similar, elongated construction materials, capable of being safely supported by the present invention. Thus, use of the all-terrain vehicle support bracket 10 is not intended to be limited solely for the support and transport of ladders.

It is further envisioned that alternatively, the all-terrain vehicle support bracket 10 may be permanently mounted via welding, bolting, or clamping to the front and rear ATV horizontal frame members 52, 60. Welding, however, would be the preferred method for permanent attachment for this modified form of the invention. As bolts require holes, this method of attachment would leave surfaces exposed thereby being more susceptible to rust.

To use the above-described embodiment, the user selects a desired extension member 30 and attaches it to the threaded cusp 23. The user then orthogonally directs retainment arms 41, 42 of the upper arm member 40 below inner cross member 56 and inner cross member 57 of front ATV horizontal frame member 52, such that the upper circumferential surface of retainment arms 41, 42 mechanically contacts and impinges against a lower circumferential surface of inner cross members 56, 57. The rear, external circumferential sidewall of main leg member 21 rests against the upper surface of vertical member 53 of the front ATV horizontal frame member 52. Finally, the user places the lateral sidewall 16a of the vertical leg 16 of the aluminum ladder 15 against the horizontally disposed impingement surface 33, and rests the forward sidewalls 16b of the vertical legs 16 of aluminum ladder 15 against the main leg member 21, thereby securely supporting the ladder 15 in a restrained manner for transport.

The use of the present invention allows a standard ATV 50 to be adapted to support an object in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An all-terrain vehicle support bracket comprising at least one frame assembly configured to be removably attachable to a portion of an all-terrain vehicle; wherein the at least one frame assembly comprises: a support surface thereon configured to support an object positioned on the support surface; an elongated main leg member having a curved, lower end forming a threaded cusp configured to threadedly receive an extension member positioned on a first end of the elongated main leg member, the main leg member having an upper end with an eye affixed thereto for providing a receiving loop for removeable attachment of a securement strap; an upper arm member positioned on a second end of the elongated main leg member; and a retaining member configured to contact the portion of the all-terrain vehicle and attach the support bracket thereto.

2. The support bracket of claim 1, further comprising a plurality of frame assemblies configured to be removably attachable to a respective portion of an all-terrain vehicle; wherein each of the plurality of frame assemblies includes a support surface thereon configured to support an object positioned on the support surface.

3. The support bracket of claim 2, wherein the plurality of frame assemblies is a pair of tubular frame assemblies that are substantially identical in structure.

4. The support bracket of claim 1, wherein at least a portion of at least one of the elongated main leg member and the extension member comprise the support surface for supporting the object.

5. The support bracket of claim 1, wherein the extension member is a substantially V-shaped extension member.

6. The support bracket of claim 1, wherein the retaining member is a plurality of arms extending substantially horizontally from the upper arm member, thereby providing a substantially horizontally retaining member.

7. The support bracket of claim 1, wherein the extension member has a lower end defining complementary threads for threadedly engaging the threaded cusp, and wherein the extension member further includes an eye affixed thereto, and wherein said eye provides a receiving loop for removable attachment of a securement strap.

8. The support bracket of claim 1, wherein the upper arm member extends perpendicularly from the main leg member in a direction opposite to the threaded cusp, the upper arm member bifurcates into two laterally opposed retainment arms in a perpendicular manner so as to generally form a T-shaped member.

9. The support bracket of claim 8, wherein the laterally opposed retainment arms are directed orthogonally below a first inner cross member and a second inner cross member of a front all-terrain vehicle horizontal frame member of the traditional all-terrain vehicle, and wherein an upper circumferential surface of each of the laterally opposed retainment arms mechanically impinge against a lower circumferential surface of the first inner cross member and the second inner cross member.

10. The support bracket of claim 8, wherein the laterally opposed retainment arms are directed orthogonally below a plurality of cross members of a rear all-terrain vehicle horizontal frame member, the cross members functioning as brace members, and wherein an upper circumferential surface of each of the laterally opposed retainment arms mechanically impinge against a lower circumferential surface of the plurality of cross members.

11. The support bracket of claim 1, wherein at least a portion of the support surface is formed upon threaded attachment of the extension member to the threaded cusp.

12. The support bracket of claim 1, wherein the main leg member has a rear, external circumferential sidewall which rests against an upper surface of a vertical member of the front all-terrain vehicle horizontal frame member.

13. The support bracket of claim 1, wherein the main leg member has a rear, external circumferential sidewall which rests against an upper surface of a generally rectangularly-shaped support member of a rear all-terrain horizontal frame member.

14. The support bracket of claim 1, wherein the extension member can be made in a plurality of sizes comprising various lengths, thereby allowing for the support bracket to accommodate a variable load capacity.

15. The support bracket of claim 1, wherein the frame assembly is designed and configured so as to rest in an angular plane, which allows for total tire clearance when an all-terrain vehicle tire is facing forward as well as when the tire is turned, after attachment of the frame assembly to the all-terrain vehicle.

* * * * *